United States Patent Office 3,121,086
Patented Feb. 11, 1964

3,121,086
NAPHTHOFUROQUINOLINEDIONES AND
NAPHTHOFUROISOQUINOLINEDIONES
Mario Francesco Sartori, Wilmington, Del., assignor to
E. I. du Pont de Nemours and Company, Wilmington,
Del., a corporation of Delaware
No Drawing. Filed May 29, 1961, Ser. No. 113,128
2 Claims. (Cl. 260—286)

This invention is directed to a new class of compounds significantly useful as dyes and dye intermediates. The naphthoquinofurandione compounds of the present invention include both the quinoline and isoquinoline derivatives, namely, the naphthofuroquinolinediones and the naphthofuroisoquinolinediones.

All of these novel compounds are colored as shown in the examples which follow. Their tinctorial strength varies with the selection of substituents. For instance, the amino derivatives are among the strongest of these dyes in either the disperse dye class (Examples 5 and 7) or the cationic dye class (Examples 6 and 8). The disperse dye types are useful in dyeing polyester fibers such as the polymeric esters of dihydric alcohols and terephthalic acid. The cationic dye types, or quaternary salts, are useful in dyeing acid-modified synthetic fibers such as the linear polyester fibers containing metal sulfonate groups (British Patent 826,248, accepted December 31, 1959) or the acid-modified polyacrylic fibers such as those described in U.S. Patent Nos. 2,837,500 and 2,837,501.

The inventor faced the problem of providing new compounds suitable for use as dye intermediates and as dyes per se, particularly for the above synthetic fibers. The usual quality requirements of strength, light and sublimation fastness were understood and met. A particular problem in this instance was that of providing cationic dyes insensitive to the presence of metals in the dyebath, and also possessing outstanding lightfastness properties.

It is, therefore, an object of this invention to provide a novel class of naphthoquinofurandione compounds having significant utility as dyes and dye intermediates. It is a further object to provide a novel class of compounds possessing outstanding lightfastness properties, particularly for the above synthetic fibers.

These and other objects will become apparent in the following description and claims.

More specifically, the present invention is directed to a dye of the formula

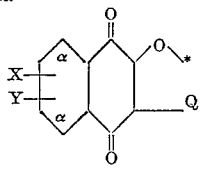

wherein X is in an indicated alpha position and is selected from the group consisting of H, Cl, Br, $NO_2$, $NH_2$, NH-alkyl ($C_{1-4}$), $NHC_6H_5$, $NHC_6H_4CH_3$, $NHC_6H_4OCH_3$, and $NHCOC_6H_5$; Y is in an indicated alpha position and is selected from the group consisting of H, $NH_2$, $NHCOC_6H_5$ and OH; Q represents an angular divalent radical of quinoline or isoquinoline selected from the group consisting of

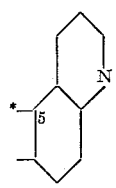

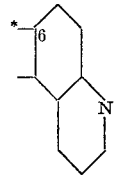

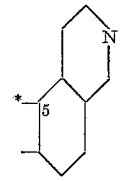

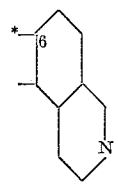

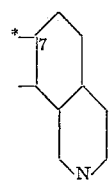

and

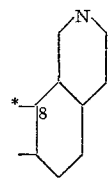

and quaternary salts thereof. The asterisks indicate common points of attachment.

Preferred embodiments of the present invention include the quaternary salt of Example 6(a), from 5-hydroxyquinoline; the amino isomers of Example 7(a), from 5-hydroxyisoquinoline; the quaternary salt of Example 8(a), from 5-hydroxyisoquinoline and the quaternary salt of Example 10(a), from 5-hydroxyisoquinoline (amino-hydroxy derivative).

The naphthoquinofurandiones of the present invention are prepared by reacting 2,3-dichloro-1,4-naphthoquinone or a derivatives thereof with a hydroxyquinoline or a hydroxyisoquinoline in a solvent such as pyridine. The reaction is generally completed after heating a few hours at about 100° C. The final product is filtered from the cooled reaction mass.

The quaternary salts are prepared from the naphthoquinofurandiones by heating them with quaternizing agents (see Example 6(d)) in inert organic solvents, such as nitrobenzene, dimethylformamide, dimethylacetamide, etc. at about 60° to 100° C. for about one to four hours.

Representative examples illustrating the present invention follow.

EXAMPLE 1

(Naphthofuroquinolinedione)

To a solution of 17 parts of 5-hydroxyquinoline in 100 parts of pyridine are added at room temperature 22 parts of 2,3-dichloro-1,4-naphthoquinone. A brown solution is formed and the temperature rises to 50° C. in about 5 minutes. The mixture is then heated to 100° C. in about one hour and stirred at this temperature for an additional 5 hours. After stirring for 12 hours at room temperature, the dark orange precipitate is collected by filtration, washed with ethanol, extracted with hot water and dried. The product which is obtained melts at 252°–254° C., after crystallization from o-dichlorobenzene. It has the formula

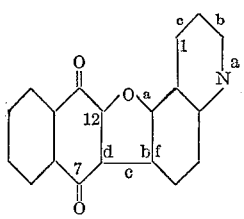

Naphth. [2,3-d] furo [2,3-f] quinoline-7,12-dione

When in this example the 5-hydroxyquinoline is replaced by an equal amount of 6-hydroxyquinoline a compound of the following formula is obtained.

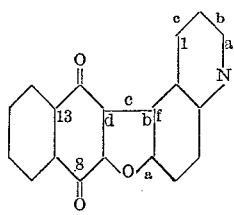

Naphtho[2,3-d]furo[3,2-f]quinoline-8-13-dione

It is a yellow powder of M.P. 298–302° C.

EXAMPLE 2

(Naphthofuroisoquinolinedione)

A solution of 17 parts of 5-hydroxyisoquinoline in 100 parts of pyridine is condensed with 22 parts of 2,3-dichloro-1,4-naphthoquinone under the conditions described in Example 1. A yellow compound is formed of the formula

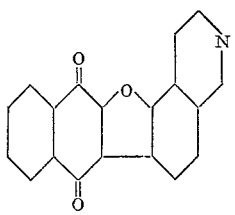

Naphtho[2,3-d]furo[2,3-f]isoquinoline-7,12-dione

Similarly, by condensing equimolecular quantities of 2,3-dichloro-1,4-naphthoquinone and 6-, 7- or 8-hydroxyisoquinoline, the corresponding naphthafuroisoquinolinediones are formed.

EXAMPLE 3

(a) A solution of 17 parts of 5-hydroxyquinoline in 100 parts of pyridine is reacted with 27 parts of 2,3-dichloro-5-nitro-1,4-naphthoquinone under the conditions described in Example 1. The product is a yellow powder and consists of a mixture of two alpha-mononitro isomers of the formula

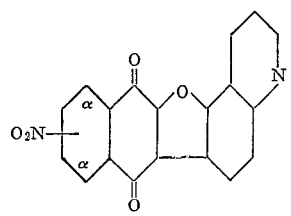

Similarly, by condensing equimolecular quantities of the naphthaquinone derivatives listed in Table I and the hydroxyquinolines listed in the same table, the corresponding naphthofuroquinolinedione derivatives are formed.

TABLE I

| Derivatives of 2,3-dichloro-1,4-naphthoquinone | Hydroxyquinolines | Color of the Naphthofuroquinolinedione Derivatives |
|---|---|---|
| (b) 5-nitro | 6-hydroxy | yellow. |
| (c) 5-chloro [1] | do | Do. |
| (d) 5-bromo [2] | 5-hydroxy | Do. |
| (e) 5-chloro-8-benzamido [3] | do | orange. |
| (f) 5-nitro-8-benzamido [4] | do | Do. |
| (g) 5-benzamido | 6-hydroxy | Do. |

[1] U.S. 2,940,983.
[2] Elsevier's Encyclopedia of Organic Chemistry (1952), vol. 12–B, pg. 2920.
[3] The 5-chloro-8-benzamido intermediate (e) in Table I is prepared by reacting at 100° C. a solution of 5-benzamido-2,3-dichloronaphthoquinone in o-dichlorobenzene with sulfuryl chloride in the presence of iodine as the catalyst.
[4] U.S. 2,863,714, Ex. 8.

EXAMPLE 4

(a) A solution of 17 parts of 5-hydroxyisoquinoline in 100 parts of pyridine is reacted with 27 parts of 2,3-dichloro-5-nitro-1,4-naphthoquinone following the procedure described in Example 1. The product is a yellow powder and consists of a mixture of two alpha mononitro isomers of the formula

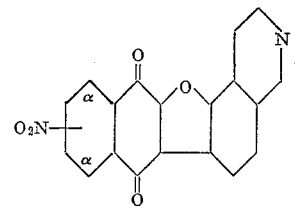

Similarly, by condensing equimolecular parts of the naphthoquinone derivatives listed in Table II and the hydroxyisoquinolines listed in the same table, the corresponding naphthofuroisoquinolinedione derivatives are obtained.

| 2,3-Dichloro-1,4-naphthoquinone Derivatives | Hydroxyisoquinolines | Color of Naphthofuroisoquinolinedione Derivatives |
|---|---|---|
| (b) 5-nitro | 7-hydroxy | greenish-yellow. |
| (c) 5-benzamido | do | orange. |
| (d) 5-chloro-8-benzamido | 5-hydroxy | Do. |
| (e) 5-nitro-8-benzamido | do | Do. |
| (f) 5-chloro | 8-hydroxy | yellow. |
| (g) 5-chloro-8-bezamido | 6-hydroxy | orange. |
| (h) 5-nitro-8-benzamido | do | Do. |

EXAMPLE 5

(a) A fine slurry of 10 parts of the nitronaphthofuroquinolinedione described in Example 3(a), in 100 parts of water is added to a stirred solution of 30 parts of sodium hydrosulfite and 27 parts of sodium hydroxide in 560 parts of water. Nitrogen is swept through the slurry and the temperature of the reaction mixture is kept at 35° to 40° C. for 1 hour. Then the solution is filtered and the filtrate is oxidized with air until oxidation is complete. The dark red precipitate is filtered off, washed with water and dried. It consists of a mixture of two alpha monoamino isomers whose solution in o-dichlorobenzene exhibits absorption maxima at 400 and 500 millimicrons. Said isomers have the formula

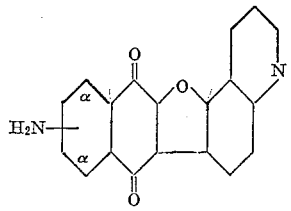

It dyes polyethyleneterephthalate fiber from a hot, aqueous disperse dye bath in red shades of very good fastness properties.

(b) When in this example the nitronaphthofuroquinolinedione is replaced by an equal amount of the nitro product described in Example 3(b) a mixture of two isomeric alpha monoamines of the following formula is obtained.

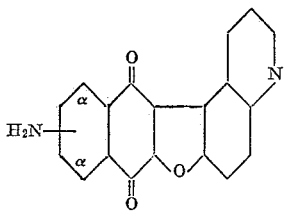

This product dyes polyethyleneterephthalate fiber from a hot, aqueous disperse dye bath in red shades of very good fastness properties to light, washing and sublimation tests.

(c) Similarly, the nitrobenzamidonaphthofuroquinolinedione of Example 3(f) is reduced to the corresponding aminobenzamido derivative which, by debenzoylation in 75–85% sulfuric acid at 85° C., gives the diaminonaphthofurouinolinedione of the formula

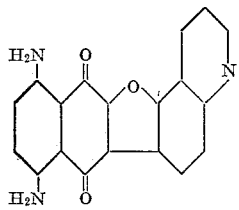

It dyes polyester fiber from a hot, aqueous disperse dye bath in blue shades of good fastness properties.

EXAMPLE 6

(a) A mixture of 10 parts of the aminonaphthofuroquinolinediones, obtained as described in Example 5(a) is stirred in 100 to 500 parts of nitrobenzene at 50°–80° C. while 10 parts of dimethyl sulfate are added. The reaction mixture is kept at 80° C. for two hours, then is cooled to 50° C. and the product is isolated by filtration, followed by washing with acetone. The product has the formula

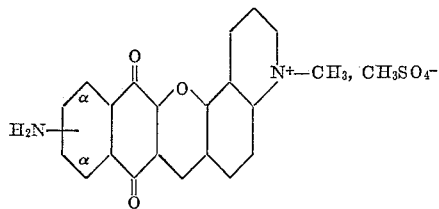

It dyes acid-modified polyester and polyacrylic fibers from a hot, weakly acidic dye bath in bordeaux shades of exceptionally good light fastness properties.

(b) When in part (a) of this example, the aminonaphthofuroquinolinedione is replaced by the diaminonaphthofuroquinolinedione of Example 5(c), a compound of the formula

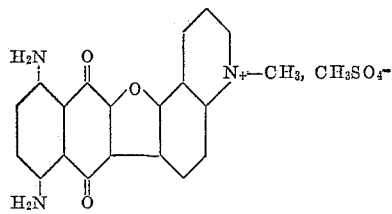

is obtained which dyes acid-modified polyacrylic and polyester fibers in blue shades of good fastness properties.

(c) Similarly, when the quaternization described in this example is carried out by using, instead of the aminonaphthofuroquinolines, the compounds listed in Examples 3 and 4 the corresponding quaternary salts are formed. Said salts dye acid-modified polyester and acrylic fibers from hot, weakly acidic dyebaths in yellow to orange shades.

(d) If in this example the methyl iodide is used instead of dimethyl sulfate, dyes of the following formulas are obtained:

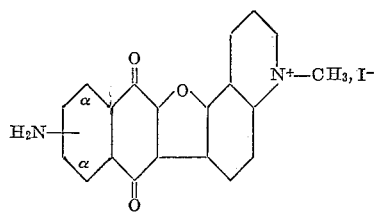

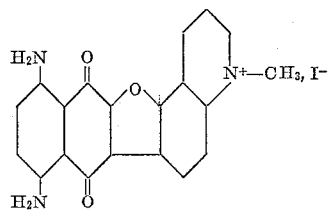

Similarly the following quaternizing agents can be used, instead of dimethyl sulfate: ethyl bromide, diethyl sulfate, benzyl bromide, benzene sulfonic acid ethyl ester, butyl chloride, p-toluene sulfonic acid methyl ester, etc.

EXAMPLE 7

(a) A fine slurry of 10 parts of the nitronaphthofuroisoquinolinedione obtained as described in Example 4(a) is reduced to the corresponding isomeric alpha amino derivatives, following the procedure described in Example 5. The product formed has the formula

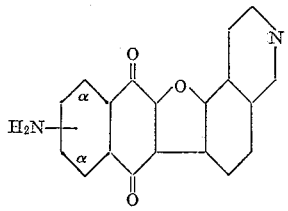

and, in o-dichlorobenzene solution, exhibits maxima located at 400 and 500 millimicrons.

This product dyes polyester fibers in red shades of very good fastness properties.

(b) When in part (a) of this example the nitronaphthofuroisoquinolinedione is replaced by the nitro product obtained as described in Example 4(e), the corresponding amino compound is obtained which, after debenzoylation, gives a diamino derivative of the formula

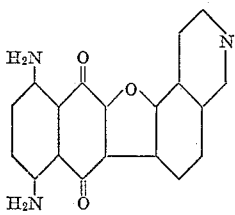

It dyes polyester fibers in blue shades of good fastness properties.

EXAMPLE 8

(a) A mixture of 10 parts of the isomeric aminonaphthofuroisoquinolines, obtained as described in Example 7(a), is treated in 100 to 500 parts of nitrobenzene with dimethylsulfate following the procedure described in Example 6(a). One obtains the isomeric alpha amino derivatives of the formula

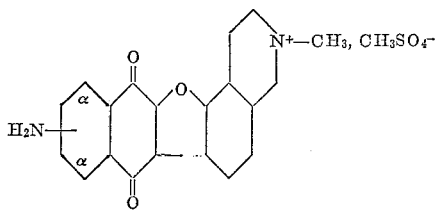

This product dyes acid-modified polyester and acrylic fibers in bordeaux shades of excellent fastness properties. The dye is insensitive to soluble salts of metals such as copper and iron in the hot, weakly acidic dyebath.

(b) When in part (a) of this example the monoamino naphthofuroisoquinolinediones are replaced by the diaminonaphthofuroisoquinolinedione of Example 7(b) a compound of the following formula is obtained.

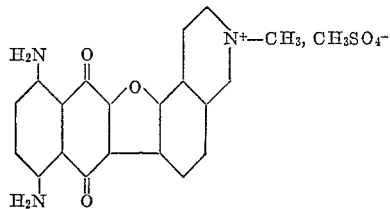

EXAMPLE 9

(a) A slurry of 2.4 parts of the nitronaphthofuroquinolinediones of Example 3(a), 1 part of palladium catalyst and 30 parts of concentrated sulfuric acid (98%) are hydrogenated at 90° C. under 45 pounds of hydrogen for 2 hours. The reaction mass is then filtered and the filtrate is poured on ice. The bluish precipitate formed is the aminohydroxynaphthofuroquinolinedione of the formula

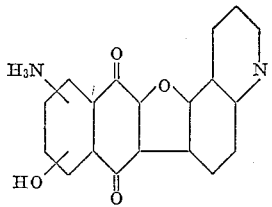

It dyes polyester fibers in blue shades of good fastness properties.

(b) When in part (a) of this example the nitronaphthofuroquinolinediones are replaced by the nitro products described in Examples 3(b), 4(a) and 4(b), the corresponding amino hydroxy compounds are obtained. These products dye polyester fibers in blue to violet shades of good fastness properties.

EXAMPLE 10

(a) Ten parts of aminohydroxynaphthofuroquinolinedione, obtained as described in Example 9(a), are stirred in 200 parts of dimethyl-acetamide at 50° C. while 8 parts of dimethyl sulfate are added. The reaction mixture is kept at 80° C. for two hours then is cooled to 40° C., poured into 2 liters of acetone and stirred. The product is isolated by filtration. It has the formula

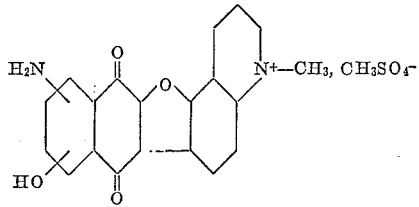

This product dyes acid-modified polyester and acrylic fibers in violet-blue shades of very good fastness properties.

(b) When in part (a) of this example, the aminohydroxynaphthofuroquinolinedione is replaced by the aminohydroxy products described in Example 9(b), the corresponding quaternized compounds are formed. These products dye acid-modified polyester and acrylic fibers from a boiling, weakly acidic dyebath in attractive red-blue shades having excellent fastness to light, washing and sublimation tests.

EXAMPLE 11

A mixture of 5 parts of the benzamidochloronaphthofuroquinolinedione described in Example 3(e), 100 parts of aniline, 5 parts of potassium acetate and 1 part of copper acetate is heated at 140° C. for 10 hours. After cooling to room temperature, the precipitate is filtered off, washed with water and dried. The product, after debenzoylation by the method described in Example 5(c), has the formula

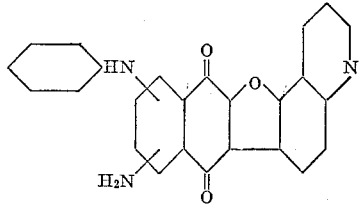

It dyes polyester fibers in blue shades having good resistance to sublimation.

When in this example the benzamidochloronaphthofuroquinolinedione is replaced by the product obtained in Example 4(d) the corresponding aminoanilinonaphthofuroisoquinolinedione is formed.

The replacement of aniline in this example by an equivalent amount of monomethylamine, butylamine, toluidines or anisidines, gives dyes of similar fastness properties.

These dyes when quaternized by the method described in Example 6 give cationic compounds which dye acid-modified polyester and polyacrylic fibers green blue shades of good fastness properties.

EXAMPLE 12

A mixture of 1.5 parts of the chloronaphthofuroquinolinedione, described in Example 3(c), 20 parts nitrobenzene, 0.6 part aniline, 1.2 parts potassium acetate and 0.6 part of copper acetate is heated at 150° C. for 10 hours. After cooling to room temperature, the precipitate is filtered off, washed with water and dried to give the corresponding anilino derivatives of the formula

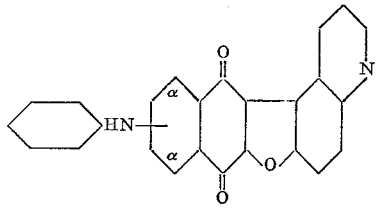

This product dyes polyester fibers blue red shades of good fastness properties.

The replacement of aniline in this example by an equivalent amount of monomethylamine, a toluidine or an anisidine, gives dyes of similar fastness properties, which can be quaternized to the corresponding cationic derivatives by treatment with quaternizing agents as described in Example 6.

When in this example the chloronaphthofuroquinolinediones are replaced by the products of Examples 3(d) and 4(f) the corresponding alkylamino and arylamino derivatives are formed.

It is understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A member selected from the group consisting of a dye of the formula

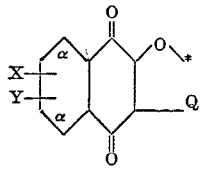

wherein X is in an indicated alpha position and is selected from the group consisting of H, Cl, Br, NO₂ NH₂, NH-alkyl wherein said alkyl group contains 1 to 4 carbon atoms, anilino, toluidino, anisidino and benzamido; Y is in an indicated alpha position and is selected from the group consisting of H, NH₂, benzamido and OH; Q is an angular divalent radical selected from the group consisting of

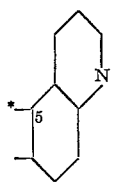

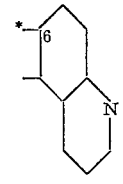

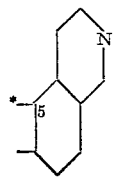

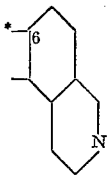

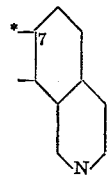

and

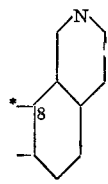

and quaternary salts thereof; the asterisks indicate common points of attachment.

2. A mixture of isomeric amino compounds of the formula

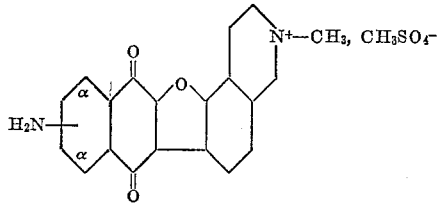

wherein the monoamino group is located in an indicated alpha position.

No references cited.

UNITED STATES PATENT OFFICE
CERTIFICATE OF CORRECTION

Patent No. 3,121,086            February 11, 1964

Mario Francesco Sartori

It is hereby certified that error appears in the above numbered patent requiring correction and that the said Letters Patent should read as corrected below.

Column 2, line 72, for "dises" read -- rises --; column 3, line 18, for "Naphth." read -- Naphtho --; same column 3, the first line immediately following the second structural formula, for "-8-13-" read ---8,13- --; column 4, the table for EXAMPLE 4, should have the centered heading "TABLE II" above it; same column 4, TABLE II, second column, line 2 thereof, for "do" read -- 8-hydroxy --; column 5, lines 48 to 56, the formula should appear as shown below instead of as in the patent:

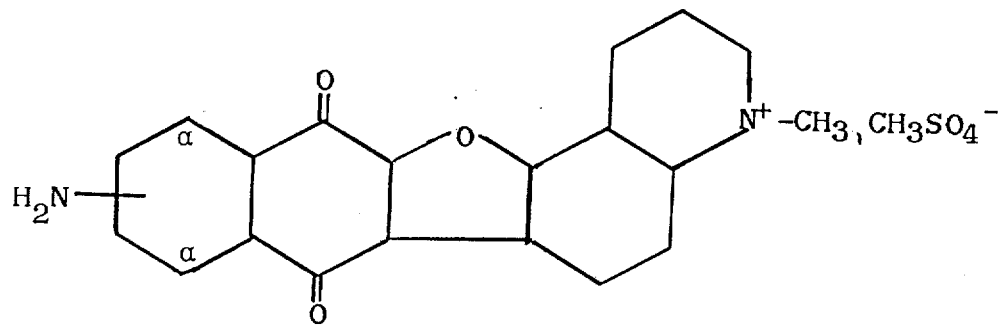

column 7, lines 40 to 48, the upper left-hand portion of the formula, for "H3N" read -- H2N --.

Signed and sealed this 21st day of July 1964.

(SEAL)
Attest:

ESTON G. JOHNSON

Attesting Officer

EDWARD J. BRENNER

Commissioner of Patents